(12) United States Patent
Handel et al.

(10) Patent No.: US 9,117,223 B1
(45) Date of Patent: Aug. 25, 2015

(54) METHOD AND SYSTEM FOR RESOURCE PLANNING FOR SERVICE PROVIDER

(75) Inventors: Sean Handel, Moss Beach, CA (US); Patrick Grady, San Francisco, CA (US); Mark Orttung, Menlo Park, CA (US); Dan Kikinis, Saratoga, CA (US)

(73) Assignee: Deem, Inc., San Francisco, CA (US)

( * ) Notice: Subject to any disclaimer, the term of this patent is extended or adjusted under 35 U.S.C. 154(b) by 1019 days.

(21) Appl. No.: 11/388,540

(22) Filed: Mar. 23, 2006

Related U.S. Application Data

(63) Continuation-in-part of application No. 11/321,769, filed on Dec. 28, 2005.

(51) Int. Cl.
  *G06F 17/30* (2006.01)
  *G06Q 30/02* (2012.01)

(52) U.S. Cl.
  CPC ...... *G06Q 30/0207* (2013.01); *G06F 17/30528* (2013.01)

(58) Field of Classification Search
  CPC .................. G06Q 30/0207; G06F 17/30528
  USPC .................. 707/1–10, 100–14, 200–205, 754
  See application file for complete search history.

(56) References Cited

U.S. PATENT DOCUMENTS

| | | | |
|---|---|---|---|
| 4,969,136 A | 11/1990 | Chamberlin et al. | |
| 5,289,531 A | 2/1994 | Levine | |
| 5,459,859 A | 10/1995 | Senda | |
| 5,513,126 A | 4/1996 | Harkins et al. | |
| 5,623,404 A | 4/1997 | Collins et al. | |
| 5,655,081 A | 8/1997 | Bonnell et al. | |
| 5,765,140 A | 6/1998 | Knudson | |
| 5,790,974 A | 8/1998 | Tognazzini | |
| 5,812,844 A | 9/1998 | Jones et al. | |

(Continued)

OTHER PUBLICATIONS

Business Editors, "Restaurant Row Selects ServeClick from Connectria to Power its Advanced Online Restaurant E-scheduling," Business Wire, New York, Feb. 1, 2000.

Orbitz, LLC, search results of online search for flights at www.orbitz.com, Mar. 11, 2009.

Reed, Dan et al., "More people find ways to squeeze fun into work trips; For many business travelers, taking family or friends on a trip at relatively low cost has become a handy job perk," USA Today, McLean VA, May 20, 2003, p. E12.

(Continued)

*Primary Examiner* — Hosain Alam
*Assistant Examiner* — Navneet K Gmahl
(74) *Attorney, Agent, or Firm* — Greenberg Traurig, LLP

(57) ABSTRACT

In one embodiment, method that can be performed on a system, is provided to take not just a person's time and location into consideration, but also has knowledge of and takes into account their availability, their preferences, their schedule, their purpose for being at their current location, and/or their next goal or stop (not just in terms of location but also in terms of activity). One embodiment is able to take into account a real-time view of supplier inventory and deduce and make available much better-adapted offerings and support for that person's travels and endeavors. In one embodiment, having an understanding of a rate of conversion and its relation to traffic and weather patterns allows service providers to make more accurate predictions about various items, including but not limited to, conversion rates, offer types, offer upgrades, traffic etc. In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

17 Claims, 7 Drawing Sheets

(56) References Cited

U.S. PATENT DOCUMENTS

| | | |
|---|---|---|
| 5,875,436 A | 2/1999 | Kikinis |
| 5,892,909 A | 4/1999 | Grasso et al. |
| 5,966,658 A | 10/1999 | Kennedy et al. |
| 6,009,408 A | 12/1999 | Buchanan |
| 6,049,778 A | 4/2000 | Walker et al. |
| 6,091,956 A | 7/2000 | Hollenberg |
| 6,094,681 A | 7/2000 | Shaffer et al. |
| 6,104,788 A | 8/2000 | Shaffer et al. |
| 6,157,945 A | 12/2000 | Balma et al. |
| 6,249,252 B1 | 6/2001 | Dupray |
| 6,253,369 B1 | 6/2001 | Cloud et al. |
| 6,292,830 B1 | 9/2001 | Taylor et al. |
| 6,317,686 B1 | 11/2001 | Ran |
| 6,336,072 B1 | 1/2002 | Takayama et al. |
| 6,370,566 B2 | 4/2002 | Discolo et al. |
| 6,381,640 B1 | 4/2002 | Beck et al. |
| 6,389,454 B1 | 5/2002 | Ralston et al. |
| 6,392,669 B1 | 5/2002 | Matoba et al. |
| 6,397,191 B1 | 5/2002 | Notaini et al. |
| 6,457,062 B1 | 9/2002 | Pivowar et al. |
| 6,480,830 B1 | 11/2002 | Ford et al. |
| 6,484,033 B2 | 11/2002 | Murray |
| 6,529,136 B2 | 3/2003 | Cao et al. |
| 6,578,005 B1 | 6/2003 | Lesaint et al. |
| 6,584,489 B1 | 6/2003 | Jones et al. |
| 6,587,835 B1 | 7/2003 | Treyz et al. |
| 6,591,263 B1 | 7/2003 | Becker et al. |
| 6,804,658 B2 | 10/2004 | Lim et al. |
| 6,837,427 B2 | 1/2005 | Overhultz et al. |
| 6,842,737 B1* | 1/2005 | Stiles et al. .................. 705/6 |
| 6,862,575 B1 | 3/2005 | Anttila et al. |
| 6,980,993 B2 | 12/2005 | Horvitz et al. |
| 7,013,149 B2 | 3/2006 | Vetro et al. |
| 7,031,998 B2 | 4/2006 | Archbold |
| 7,035,811 B2 | 4/2006 | Gorenstein |
| 7,072,886 B2 | 7/2006 | Salmenkaita et al. |
| 7,124,024 B1 | 10/2006 | Adelaide et al. |
| 7,139,978 B2 | 11/2006 | Rojewski |
| 7,194,417 B1 | 3/2007 | Jones |
| 7,280,823 B2 | 10/2007 | Ternullo et al. |
| 7,283,970 B2 | 10/2007 | Cragun et al. |
| 7,284,002 B2 | 10/2007 | Doss et al. |
| 7,289,812 B1 | 10/2007 | Roberts et al. |
| 7,296,017 B2 | 11/2007 | Larcheveque et al. |
| 7,308,420 B1 | 12/2007 | Storch et al. |
| 7,330,112 B1 | 2/2008 | Emigh et al. |
| 7,343,317 B2 | 3/2008 | Jokinen et al. |
| 7,376,735 B2 | 5/2008 | Straut et al. |
| 7,394,900 B1 | 7/2008 | Gerber et al. |
| 7,409,643 B2 | 8/2008 | Daughtery |
| 7,426,537 B2 | 9/2008 | Lee et al. |
| 7,430,724 B2 | 9/2008 | Othmer |
| 7,441,203 B2 | 10/2008 | Othmer et al. |
| 7,562,027 B1* | 7/2009 | Baggett et al. .................. 705/5 |
| 7,599,858 B1 | 10/2009 | Grady |
| 7,603,291 B2 | 10/2009 | Raiyani et al. |
| 7,806,328 B2 | 10/2010 | Chakravarthy |
| 2001/0025314 A1 | 9/2001 | Matsumoto et al. |
| 2001/0029425 A1 | 10/2001 | Myr |
| 2002/0010604 A1 | 1/2002 | Block |
| 2002/0026356 A1 | 2/2002 | Bergh et al. |
| 2002/0032591 A1 | 3/2002 | Mahaffy et al. |
| 2002/0049644 A1 | 4/2002 | Kargman |
| 2002/0069093 A1* | 6/2002 | Stanfield .................. 705/5 |
| 2002/0072938 A1 | 6/2002 | Black et al. |
| 2002/0095333 A1 | 7/2002 | Jokinen et al. |
| 2002/0095454 A1 | 7/2002 | Reed et al. |
| 2002/0099613 A1 | 7/2002 | Swart et al. |
| 2002/0115430 A1 | 8/2002 | Hall |
| 2002/0116266 A1 | 8/2002 | Marshall |
| 2002/0143655 A1 | 10/2002 | Elston et al. |
| 2002/0160745 A1 | 10/2002 | Wang |
| 2002/0178034 A1 | 11/2002 | Gardner et al. |
| 2002/0178226 A1 | 11/2002 | Anderson et al. |
| 2003/0023499 A1 | 1/2003 | Das et al. |
| 2003/0028390 A1 | 2/2003 | Stern et al. |
| 2003/0033164 A1 | 2/2003 | Faltings |
| 2003/0050964 A1 | 3/2003 | Debaty et al. |
| 2003/0058842 A1 | 3/2003 | Bud |
| 2003/0120530 A1 | 6/2003 | Casati et al. |
| 2003/0126095 A1 | 7/2003 | Allen |
| 2003/0126205 A1 | 7/2003 | Lurie |
| 2003/0140172 A1 | 7/2003 | Woods et al. |
| 2003/0187705 A1 | 10/2003 | Schiff et al. |
| 2003/0194065 A1 | 10/2003 | Langseth et al. |
| 2003/0200146 A1 | 10/2003 | Levin et al. |
| 2003/0208754 A1 | 11/2003 | Sridhar et al. |
| 2003/0220835 A1 | 11/2003 | Barnes, Jr. |
| 2003/0229900 A1 | 12/2003 | Reisman |
| 2003/0233365 A1 | 12/2003 | Schmit |
| 2004/0064355 A1 | 4/2004 | Dorenbosch et al. |
| 2004/0064585 A1 | 4/2004 | Doss et al. |
| 2004/0088107 A1 | 5/2004 | Seligmann |
| 2004/0104977 A1 | 6/2004 | Mitsuhashi |
| 2004/0128196 A1 | 7/2004 | Shibuno |
| 2004/0193432 A1 | 9/2004 | Khalidi |
| 2004/0215517 A1 | 10/2004 | Chen et al. |
| 2004/0220847 A1 | 11/2004 | Oguishi et al. |
| 2004/0225540 A1 | 11/2004 | Waytena et al. |
| 2005/0014558 A1 | 1/2005 | Estey |
| 2005/0040230 A1 | 2/2005 | Swartz et al. |
| 2005/0043974 A1 | 2/2005 | Vassilev et al. |
| 2005/0071245 A1 | 3/2005 | Norins et al. |
| 2005/0091005 A1 | 4/2005 | Huard |
| 2005/0125439 A1 | 6/2005 | Nourbakhsh et al. |
| 2005/0138187 A1 | 6/2005 | Breiter et al. |
| 2005/0154736 A1* | 7/2005 | Meikleham et al. ............ 707/10 |
| 2005/0209772 A1 | 9/2005 | Yoshikawa et al. |
| 2005/0227712 A1 | 10/2005 | Estevez et al. |
| 2005/0273373 A1 | 12/2005 | Walker et al. |
| 2006/0004511 A1 | 1/2006 | Yoshikawa et al. |
| 2006/0009987 A1 | 1/2006 | Wang |
| 2006/0010206 A1 | 1/2006 | Apacible et al. |
| 2006/0020565 A1 | 1/2006 | Rzevski et al. |
| 2006/0041477 A1 | 2/2006 | Zheng |
| 2006/0059024 A1* | 3/2006 | Bailey et al. .................. 705/5 |
| 2006/0085276 A1 | 4/2006 | Hoech et al. |
| 2006/0090185 A1 | 4/2006 | Zito et al. |
| 2006/0173747 A1 | 8/2006 | Gantman et al. |
| 2006/0206412 A1 | 9/2006 | Van Luchene et al. |
| 2006/0235754 A1 | 10/2006 | Walker et al. |
| 2006/0247954 A1 | 11/2006 | Hunt |
| 2007/0016439 A1* | 1/2007 | Stiles et al. .................. 705/1 |
| 2007/0016514 A1 | 1/2007 | A-Abdulqader et al. |
| 2007/0033087 A1 | 2/2007 | Combs et al. |
| 2007/0143153 A1 | 6/2007 | Ashby et al. |
| 2007/0162301 A1 | 7/2007 | Sussman et al. |
| 2007/0162328 A1 | 7/2007 | Reich |
| 2007/0208604 A1 | 9/2007 | Purohit et al. |
| 2008/0046298 A1* | 2/2008 | Ben-Yehuda et al. ............ 705/6 |
| 2009/0030609 A1 | 1/2009 | Orttung |
| 2009/0030742 A1 | 1/2009 | Orttung |
| 2009/0030769 A1 | 1/2009 | Orttung |
| 2010/0023407 A1 | 1/2010 | Grady |
| 2011/0004497 A1 | 1/2011 | Mortimore, Jr. et al. |

OTHER PUBLICATIONS

Sharkey, Joe, "Leisure activities are increasingly being fitted in to help make life on the road less of a grind," The New York Times, New York, N.Y., Apr. 18, 2001, p. C6.

Smith, Calvin et al., "The Talaris Services Business Language: A Case Study on Developing XML Vocabulaires Using the Universal Business Language," School of Information Management & Systems, University of California, Sep. 2002, pp. 1-16.

Kanaley, Reid, "More Ways Than One to Access Crowded AOL," Philadelphia Enquirer, p. F1, Jan. 16, 1997.

* cited by examiner

METHOD AND SYSTEM FOR RESOURCE PLANNING FOR SERVICE PROVIDER

RELATED APPLICATIONS

The present application is a continuation-in-part of U.S. application Ser. No. 11/321,769, entitled "Method and System for Prediction and Delivery of Time-and Context-Sensitive Services," filed Dec. 28, 2005 which is incorporated herein by reference.

BACKGROUND OF THE INVENTION

Location-based systems for tracking and mapping the movements of a subject are not new. They have generated more publicity and speculation than products, but some systems are currently available. These current systems rely mainly on technologies such as global positioning system (GPS) technology, such as Locate911, GPS/911, NAVSTAR GPS, or other equivalent technologies. They can give the identity of a person, the time, and their location. But while some services work globally, without regard to network or location on Earth, others are restricted to a specific network and or specific coverage locations. Some services use such technology to provide, for example, interactive network-based driving instructions. Rather than offering a car-based satellite navigation system, such a service uses a phone, usually a cell phone, to send its GPS information periodically to a server, which then uses that information to send maps of the current location, such as a street or other locator, back to the phone. Thus a user may enter (into said device) a target location and the phone can then display and guide the user through a route to the target. Other systems may provide people with auxiliary services such as, for example, a selection of restaurants nearby.

SUMMARY

In one embodiment, method that can be performed on a system, is provided to take not just a person's time and location into consideration, but also has knowledge of and takes into account their availability, their preferences, their schedule, their purpose for being at their current location, and/or their next goal or stop (not just in terms of location but also in terms of activity). One embodiment is able to take into account a real-time view of supplier inventory and deduce and make available much better-adapted offerings and support for that person's travels and endeavors. In one embodiment, having an understanding of a rate of conversion and its relation to traffic and weather patterns allows service providers to make more accurate predictions about various items, including but not limited to, conversion rates, offer types, offer upgrades, traffic etc.

In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
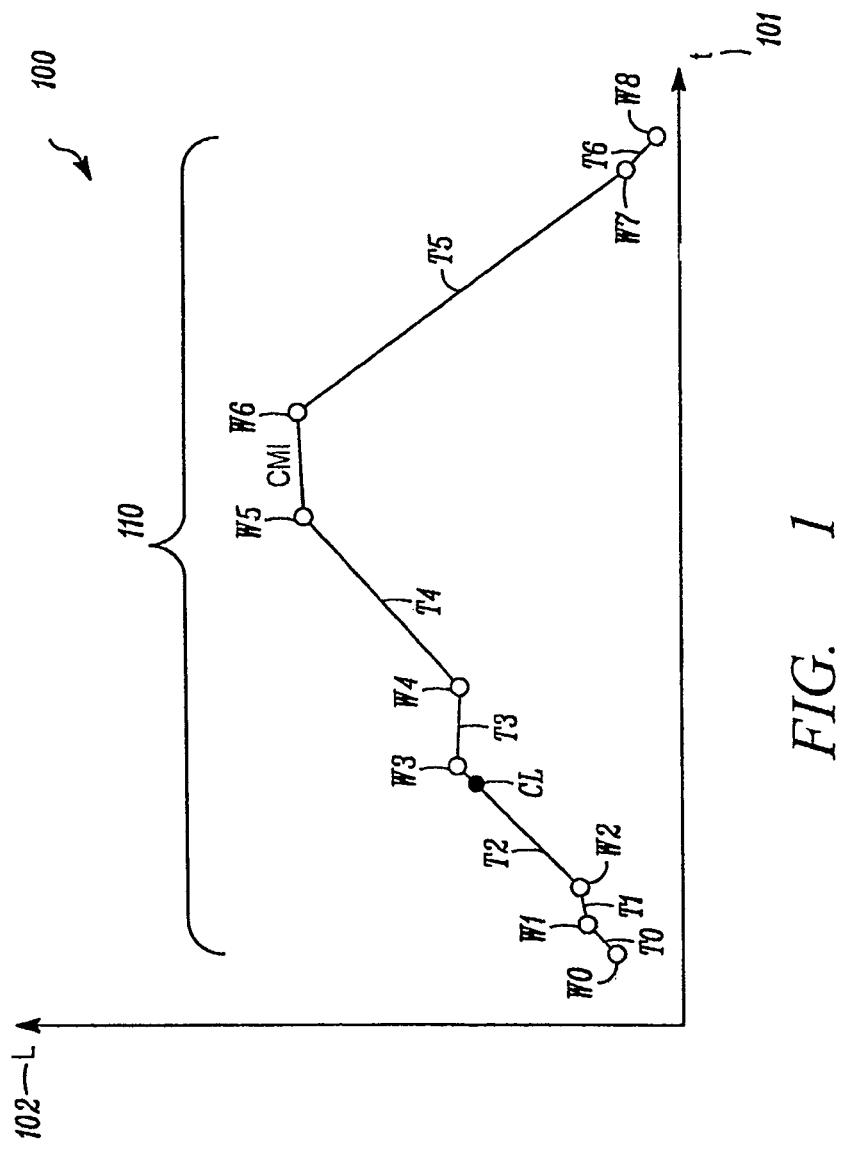
FIG. 1 presents an exemplary time-and-location graph, mapping the travels and activities of a person, in accordance with one embodiment.

FIG. 1 shows an exemplary time-and-location graph 100, mapping the travels and activities of a person. Locations are plotted along vertical axis I 102, and times are plotted along horizontal axis t 101. Way points W0-W8, which are locations where a person has some planned activity that relates to their business or their travel, and meeting segment M1 lie along travel segments T0-T6. For example, the travel segment T3 between points W3 and W4 could be when and where a traveler changes planes in O'Hare Airport in Chicago, moving between his arrival gate, which in this example is W3, and his departure gate, which in this example is W4. The traveler arrives on a plane whose flight is travel segment T2, and he must depart on another plane whose flight is travel segment T4. His location, which, in this example, is his current location CL, is on the arrival path into the airport, as indicated by the placement of CL on travel segment T2.

Figure 2:
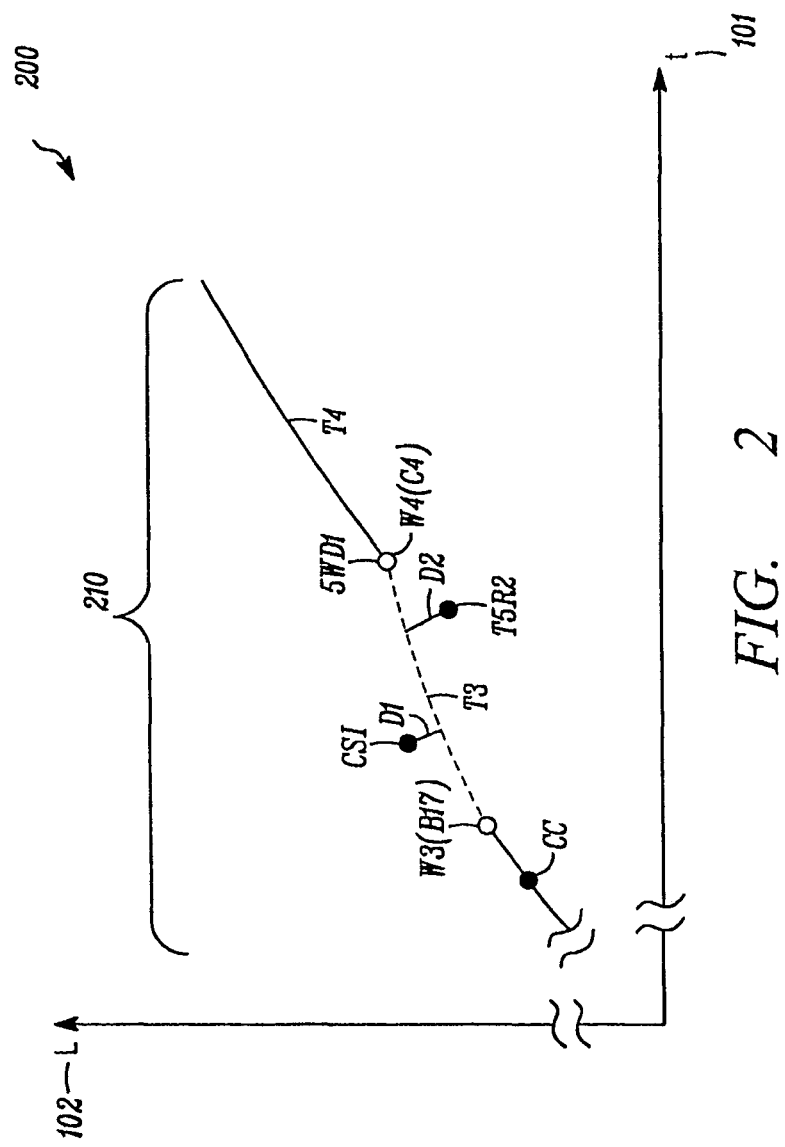
FIG. 2 presents a time-and-location graph that shows the plane-change portion of the trip, in accordance with one embodiment.

FIG. 2 is a time-and-location graph 200 that shows the plane-change portion of the trip mentioned as an example in the description of FIG. 1, above. Current location CL is shown in magnified graph section 210. Way point W3 could be, for example, gate B17, where the traveler arrives, and way point W4 could be gate C4, where he is scheduled to depart. Thus the traveler must walk, in this case, from W3 to W4, along travel segment T3. Along this segment lie a coffee shop CS1, for example, or a full-service restaurant FSR2, at certain distances D1 and D2 from point W3. With the predictive context-sensitive awareness system of this invention, the traveler's phone could tell him that he does not have food service on his next flight and could also tell him the location of restaurants CS1 and FSR2 in the path between gates, basing the selection of these two restaurants for his information on his past preferences. In addition, based on merchant agreements for priority listings, various food merchants in the airport may receive notification of the traveler's future planned and current activity, so in real time/dynamically, or in the future, these merchants could offer the traveler a discount coupon to attract him to their business, or could send him an online menu so he could, for example, view the menu and order food to be ready when he arrives, either for on-site consumption or to go for his next flight. Further, referring to his preferences and past behavior, the system may submit only certain of these offers to him.

Additionally, in one embodiment a real-time/dynamic link to the supplier's inventory system affects which offers are made by suppliers. For example, a café might have twice the expected inventory of chocolate chip cookies, which can't be sold beyond four hours from time of baking. Based on this inventory level, the supplier system would offer free chocolate chip cookies to passers by until the inventory level reaches the supplier's expected levels again, at which point the offers would stop.

Figure 3:
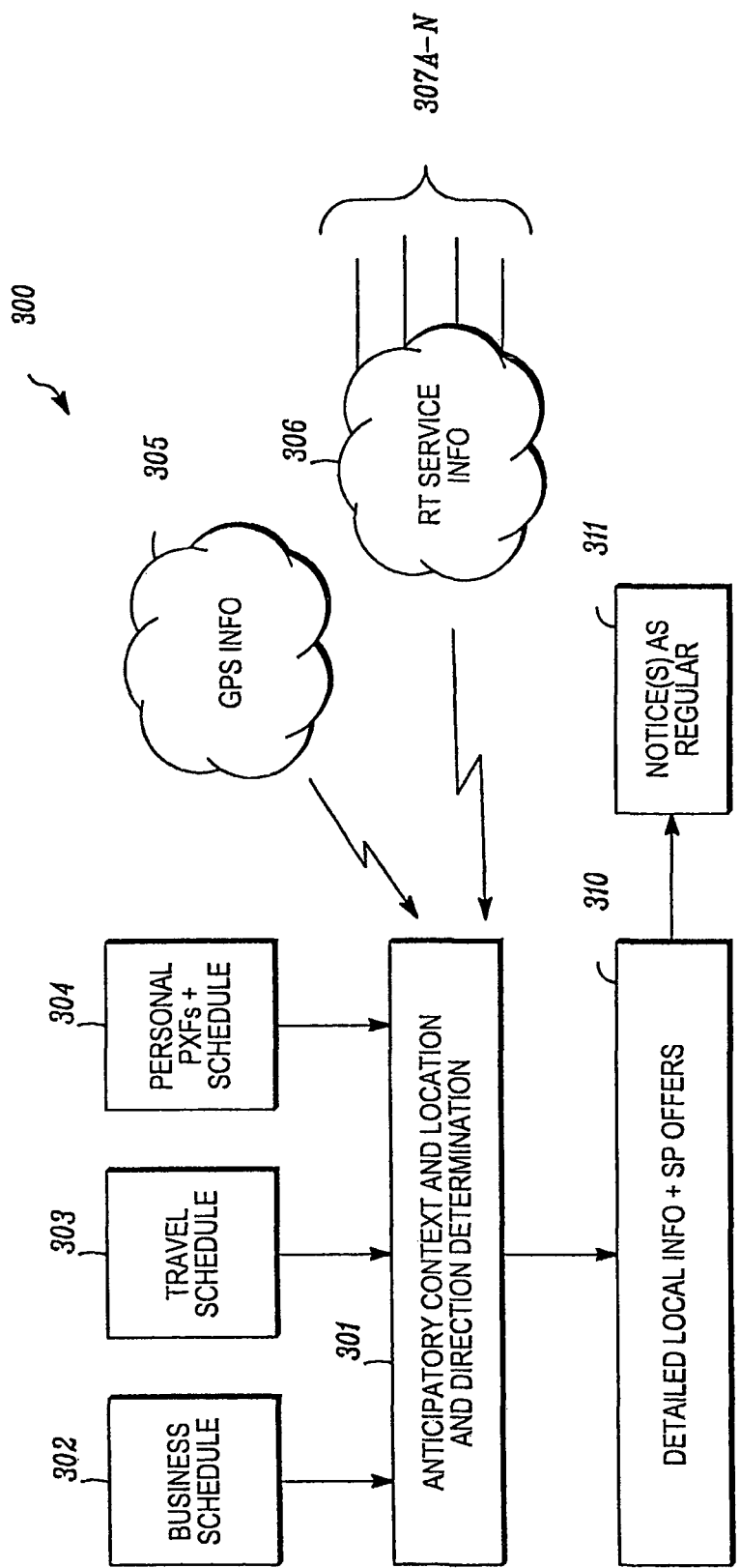
FIG. 3 shows an overview of the architecture of one embodiment of a system.

FIG. 3 shows an overview of the architecture of one embodiment of a system 300. The anticipatory context and location-sensitive and direction-determination system 301 is using information coming from many source, such as the business schedule 302, the travel schedule 303, and the personal preferences and schedule of the traveler 304. Information also comes from the GPS information from user's device 305 (this may be GPS or other equivalent location technology, herein generally referred to as GPS) and real-time service provider information 306, which may be provided by any of a large variety of service providers in real time through connections 307 a-n. In other cases this information may be collected in another section of a service platform and provided directly from there. This information may trickle in based on travel schedules, or it may be returned based on requests specific to the travel schedule being examined. This supplier information would include information on the real-time status of inventory levels and the state of the supplier's yield management system. The information is then processed with detailed local information and service provider offers in section 310, and the results are processed and are sent as notices to the user or to other members of his business team, family, or other involved persons, or to service providers as required.

In one embodiment the individual service events that are booked for a user report relevant events it creates to a centralized system. In one embodiment, the structure for the events generated by services include any of multiple parameters, such as the date and time of the event start; the date and time of the event end; the location (address, airport, train station, etc.) where that event starts; the location (address, airport, train station, etc.) where that event ends; the type of travel between destinations, which may include, but is not limited to, such carriers as airplane, car, and train; the location of travel between destinations, which may include, for example, traveling between, at destination, or near destination; people who are sharing this event (for example, if a limo is booked with two passengers, then those two people would be named); availability of people involved in event; and options such as not available or available via such communication means as mobile phone, work phone, home phone, text messaging, email, or instant messenger.

In other embodiments, the events also include surrounding time periods affected by this reservation. For example, the fact that a traveler has a flight that is scheduled to depart at 4 p.m. means that he is likely to be traveling to the airport for some period of time before that flight departs and will be unavailable for certain things such as phone calls, email or marketing offers. However, if said traveler has a layover between flights, he may be available to receive offers for restaurants in the B concourse at O'Hare offering discounts to him over his mobile phone. In addition, the user should be able to set preferences for each service that indicate how he would like to be available during specific events. For example, the flight service may allow the user to indicate that during the layover period at an airport, he is available via SMS and email, but not by phone. One embodiment allows for a more detailed availability model controlled in part by the user. One embodiment also allows for a detailed analysis of the dependencies between services. For example, if a user changed his flight leaving from SFO, the system could derive from this event list that he probably also wants to change his airport parking service at SFO.

In one embodiment, if a travel line (time and/or place) is changed due to, for example, a late flight, changed plans, or early or late conclusion of business at a certain stop may include, but are not limited to, notification of affected parties, such as a limo service (to reschedule a pick-up time), family and/or friends, a hotel (to reschedule, cancel, or book reservations), a restaurant (also to reschedule, cancel, or book reservations); and making alternate arrangements, based on known preferences, such as booking a limo instead of a cab, booking an earlier or later flight, including seat reservations, arranging a car rental, presenting public transportation routes and schedules with information about getting via shuttle or train from the airport to the hotel, etc. For example, the system may let the traveler know whether a nearby hotel has early check-in available, thus letting the traveler decide whether to proceed to the hotel and take a shower, or shower at the airport lounge, or go to an offsite restaurant.

One embodiment also coordinates offers from businesses and suppliers, based on knowledge of a traveler's stops and route/path, such as special deals, based on known preferences and past spending from businesses more or less along the traveler's path. Suppliers may send a movie, documents, restaurant menu, etc., for the next flight segment, to pick up at the airport, waiting at the gate, or, in the case of digital items, even directly to user's devices such as a mobile phone or personal digital assistant (PDA). For example, a traveler may order a movie or other program in flight, so it can be downloaded and ready when the plane lands, waiting on a DVD or ready for transfer to a memory stick. Further, one embodiment sends the traveler messages with information about the airport, such as whether passing through a security checkpoint is required to get to a certain merchant or for changing buildings, etc., or about the availability of services in and out of the airport security zone (i.e., for a quick meeting with local non-traveler, etc.).

With predictive knowledge of future traffic near their establishment at a given time period, suppliers can prepare in various ways, such as, for example, by ordering appropriate amounts of perishable food, by making special offers based on light traffic (deeper discounts) or heavy traffic (discounts on food to go, to reduce crowding on site). Also, the further a merchant is off the route of a traveler, the more of an incentive the merchant may offer to the traveler to go to his establishment, in addition to a low traffic discount.

One embodiment schedules variable intervals of GPS checking, such as every 15 seconds, 30 seconds, 5 minutes, 1 km, etc. Further, the checking interval may depend on the traveler's location and available services. For example, in an airport, precise location is important because of the many services available in the area, while the location of a car traveling across the Mojave Desert is less critical because there are no services for miles.

The installation of microcells on airplanes facilitates cell phone GPS and predictive services as described herein. Further, one embodiment use subsets of microcells (IP addresses), to ascertain the traveler's location very specifically; for example, on a particular flight, or at some other specific location. Thus by checking the traveler's ID and having knowledge of his plans and schedule, one embodiment ensures that he is in the right place at the right time, e.g., at the right gate for the correct flight. Alternative embodiments may apply to other situations besides airplanes, including but not limited to cars, busses, boats, trains etc.

As the system detects changes or deviations from the predicted itinerary, the offers of service are adjusted accordingly, in one embodiment. For example, if a traveler's flight is cancelled and the traveler is rebooked on a flight early the next morning, the system could offer bookings at nearby hotels.

One embodiment includes countermeasures to prevent unauthorized knowledge of the user's ID, for security purposes.

In one embodiment payment options, such as the use of credit cards such as American Express, VISA, Master Card, etc., and payment services such as PayPal, because they are accepted universally, even by small businesses. Thus, codes for discounts and promotions delivered to the user can be applied to credit card charges.

Figure 4:
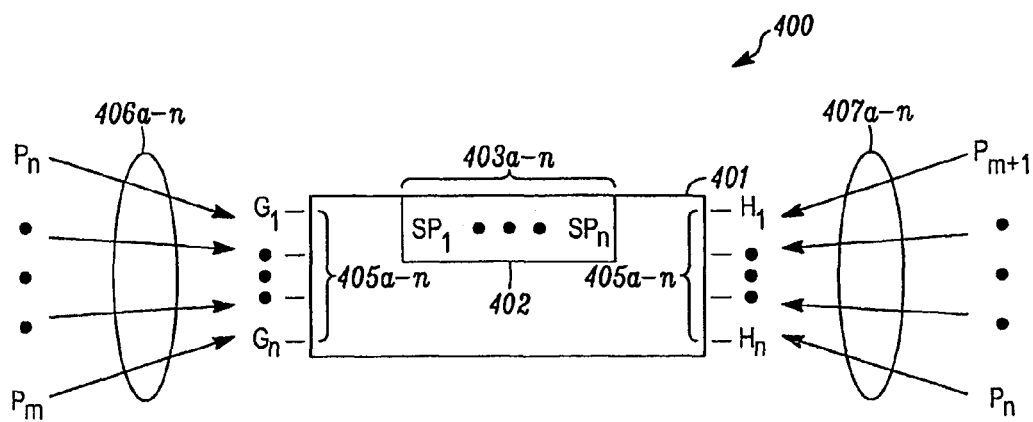
FIG. 4 illustrates an example travel environment.

FIG. 4 shows an example travel environment 400. It is clear that this travel environment is only exemplary and other kinds of environments are also applicable, including those examples given above, but for purposes of clarity and simplicity the focus shall be on this example environment. Terminal 401 is a typical commercial airline terminal, with two sets of gates G1-Gn 404a-n and H1-Hn 405a-n. There is also food court 402 with a concentration of service providers SP1-SPn 403a-n. Planes P1-Pn come from both sides, as indicated by arrows 406a-n and 407a-n. In such an environment, most airline flights are typically to or from a hub terminal, wherein travelers arrive and then leave again on connecting flights within a very short period of time.

Figure 5:
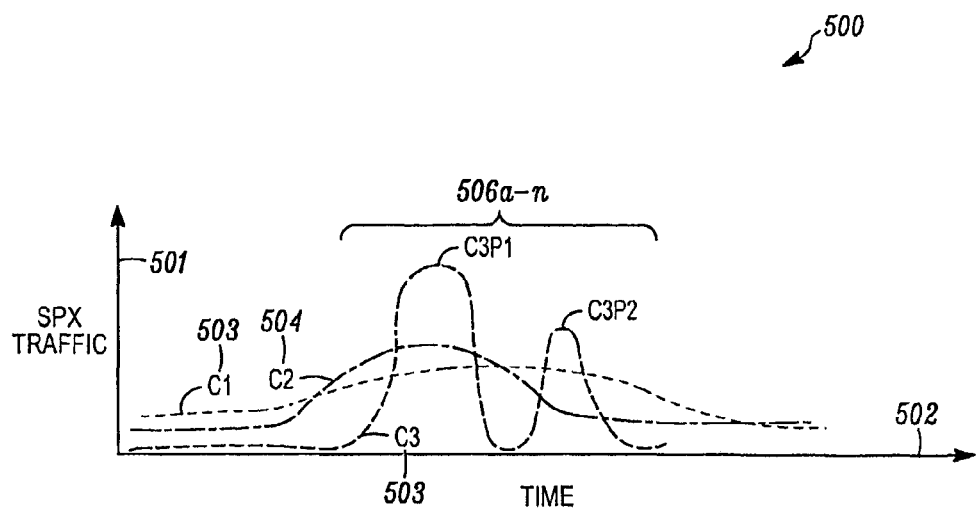
FIG. 5 illustrates a graph of traffic variations at service provider.

FIG. 5 shows a graph 500 of traffic variations at service provider SPx. The traffic quantity is shown on the vertical axis 501 and the time range is shown on the horizontal axis 502. Three example traffic curves are shown: curve C1 503, curve C2 504, and curve C3 505. Each curve has a different peak, or peaks, in the peak area 506a-n. For example, curve C1 has a flat spread, in the case that the arrival and departure of planes is spread over a wider range of time, due perhaps to intentional scheduling and also to early and late arrival of some planes; while curve C2 shows a medium peak, with tighter scheduling but also with a few flights being delayed and others being early, resulting in a more condensed peak traffic; and curve C3, due to, for example, schedule changes or weather-related problems in some part of the country, has two very sharp peaks C3P1 and C3P2. Depending on various conditions, such as scheduling and weather, as well as the amount and availability of food on the airplanes, the rate of conversion of offers tendered to travelers for goods and services at the terminal into sales may change, because people, if given a choice between having a snack and catching the next flight, will normally opt for catching the next flight. Having an understanding of the rate of conversion and its relation to traffic and weather patterns allows service providers to make more accurate predictions about various items, including but not limited to, conversion rates, offer types, offer upgrades, traffic etc.

Figure 6:
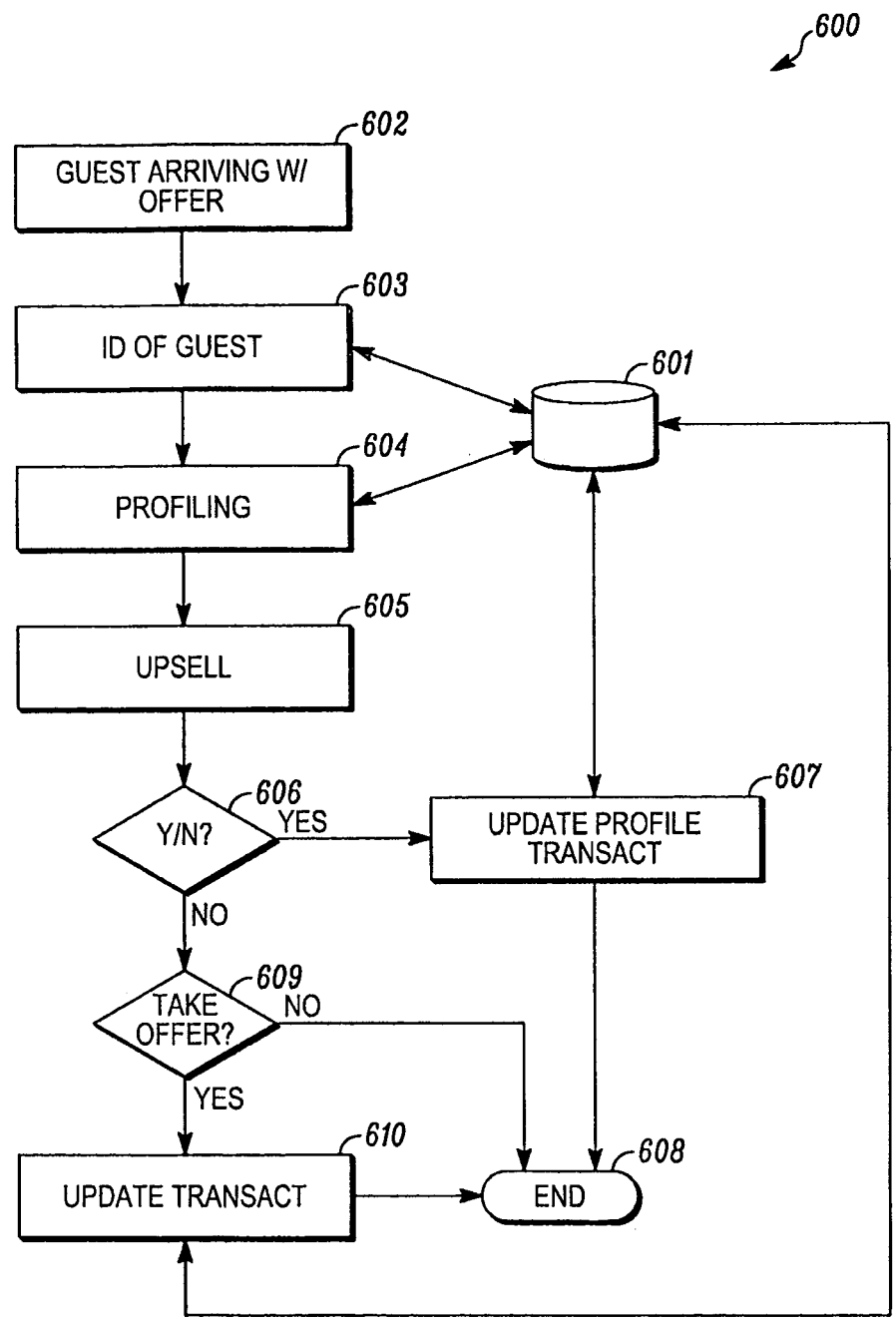
FIG. 6 provides a diagram of a process flow that could be used to analyze the conversions, in accordance with one embodiment.

FIG. 6 is a diagram of a process flow 600 that could be used to analyze the conversions. In process 602, a guest arrives at the service provider with an offer (typically, for food or other merchandise, or for a service). In process 603, a guest's ID is compared to information stored in database 601, which could be a local database, or part of a larger remote database, or two synchronized databases, or some combination of the these. In process 604 the profile information about the registered guest (i.e., traveler) is extracted from database 601, then used to update the profile. In particular, You download the profile to do what ever you do, then you may want to update what it is that you have done (e.g. a new offer), and possibly what the customers reaction to that offer was etc. In process 605, an up-sell (upgrade of the offer) may be offered to the guest. At process 606, the process branches. If the guest accepts (YES), the process moves to process 607, where the transaction takes place and the guest profile is updated in database 601, and then to process 608, where the process ends. If, in process 606, the guest does not accept the up-sell (NO), the process moves to process 609, where it again branches. If the guest accepts the original offer (YES), in process 610 the transaction takes place, the guest profile is updated (in some cases, the supplier database may be updated as well) in database 601, and the process moves to process 608, where it ends. If the guest does not accept the original offer (NO), the process ends at process 608.

Additional information, including but not limited to, conversion rates by flight, day of the week, season, weather, flight size, flight utilization, etc., may be collected by individual service providers and then pulled together for further analysis and refined prediction models, allowing more targeted offers. Many modifications can be made without departing from the spirit of the invention. In some cases, for example, the service providers may have their own systems interface with the system of the present invention. In other cases, a solution may be extended by the operator of such a system, offering a complete solution based on a simple terminal device, or in yet other cases, a system may be offered by a credit card or other business service provider, as part of a larger package.

In yet another aspect of the invention, the information collected from many travelers, and also information collected from airlines and weather observers, etc., can be used to forecast inventory requirements, such as obtaining and preparing fresh food and pulling from storage chilled or frozen food, as well as man power or staffing level requirements, to meet projected demands.

Figure 7:
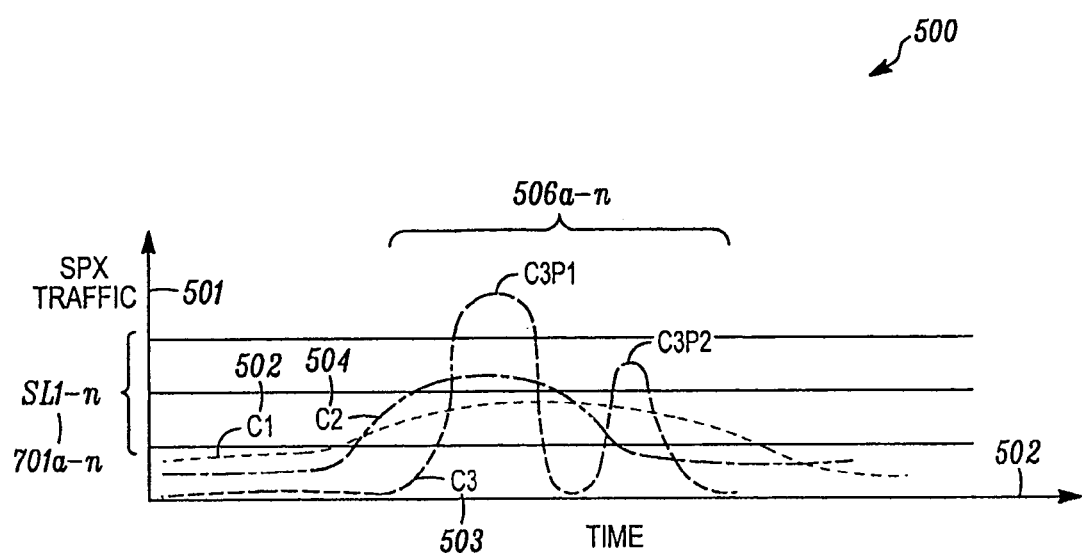
FIG. 7 illustrates a graph of traffic variations at service provider.

FIG. 7 shows a traffic graph with many of the same elements as FIG. 5 (see description, above). What has been added are horizontal lines indicating staffing levels SL1-n 701a-n. Thus when traffic peaks to the next line SLn, a higher staffing level would be required. Hence calculations must be made to forecast staffing levels some time ahead of the forecasted peak traffic, because people need notice to come to a work place. In a similar manner, forecasted food requirements must be calculated; for example, how many rolls need to be prepared and baked so there are freshly baked rolls when customers arrive at peak traffic times, etc.

Figure 8:
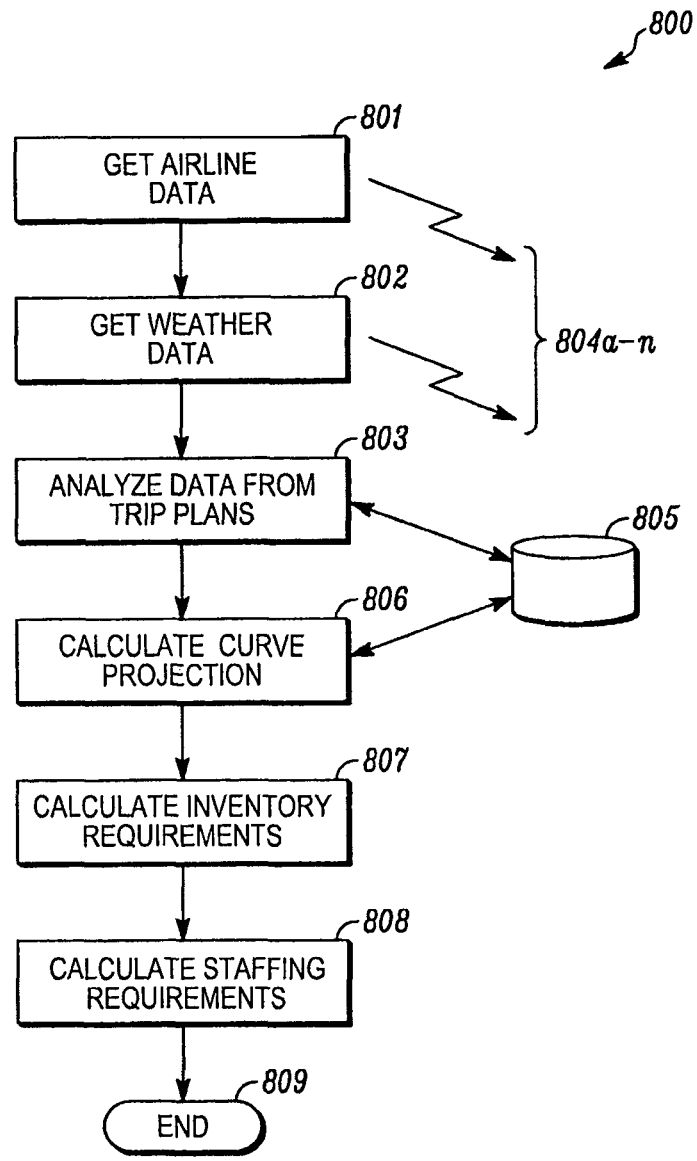
FIG. 8 provides a diagram of a process for calculations in support of forecasting, in accordance with one embodiment.

FIG. 8 is a diagram of a process flow 800 for calculations required for the types of forecasting discussed above. In step 801 the system obtains airline data, such as arrival and departure times, both actual (real-time) information and statistical models, as well as usage of the airplane and the airplane model, allowing the system to estimate the number of people expected at a certain time. The data is obtained via communication lines 804a-n, which may connect to a local or remote database in the system, or to both, or directly to a service provider. The weather data is collected in a similar manner in step 802, including, but not limited to, weather data from each flight's point of origin and weather data at the current airport location, because weather experienced at the beginning, during, and end of the flight may impact how travelers feel; whether they are more or less thirsty and/or hungry. Cold and rainy weather may promote the use of warm "comfort foods" while hot and dry weather promotes lighter foods and cold drinks, smoothies etc. This may also be modified by where travelers go to or come from, as the expectation of weather at the end of a trip, or just experienced weather a short while ago may impact how travelers feel about what food they desire. Large statistical gathering, preferably by demographics as well, may allow to cull meaningful data allowing to make better predictions, and hence reduce potential waste. In step 803, data is analyzed from known members, typically the registered travelers using the service (but in some cases, that may include planes, or groups of travelers including non-registered ones etc.) that have a well known track record. This information of these "well-known" or "bell weather" travelers can then be extrapolated, particularly in cases of insufficient statistical data for a current event, using also correlation to other information, including, but not limited to, historic data on weather, plane timeliness, plane capacity and usage, etc., some of which may be also stored in DB 805. All this information is then used in step 806 to calculate forecasted curves of required resources (inventory and man power). The system may not calculate just one curve, but multiple curves; for example, one each for multiple types of inventory, one for staffing level, and one each for other similar resources required by the service provider. In step 807 the actual requirements for each inventory item are calculated, with quantities given in ordering lots; for example, the rolls would be calculated by the tray, or fresh fruit would be calculated by the case, etc. In step 808, also according to the curves, the staffing level is likewise calculated, so that if necessary additional workers may be called in as auxiliary staff (not shown). In step 809, the process ends.

It is clear that many modifications and variations of this embodiment may be made by one skilled in the art without departing from the spirit of the novel art of this disclosure. Additional information, including but not limited to, resource requirements by flight, day of the week, season, weather, flight size, flight utilization, etc., may be collected by individual service providers and then pulled together for further analysis and refined prediction models, allowing more targeted resource predictions. Many modifications can be made without departing from the spirit of the invention. In some cases, for example, the service providers may have their own systems interface with the system of the present invention. In other cases, a solution may be extended by the operator of such a system, offering a complete solution based on a simple terminal device, or in yet other cases, a system may be offered by a credit card or other business service provider, as part of a larger package.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive).

Alternatively, the logic to perform the processes as discussed above could be implemented in additional computer and/or machine readable media, such as discrete hardware components as large-scale integrated circuits (LSI's), application-specific integrated circuits (ASIC's), and firmware such as electrically erasable programmable read-only memory (EEPROM's).

What is claimed is:

1. A computer implemented method comprising:
    generating, via a computing device, an estimate of a quantity of travelers to arrive at a destination at designated time periods;
    obtaining, via the computing device, weather data related to an itinerary of the travelers;
    selecting, via the computing device, services or products to be offered to the travelers, the services or products to be selected based at least in part on the weather data related to the itinerary of the travelers, wherein the weather data comprises weather data for a point of origin for a set of the travelers;
    identifying, via the computing device, a quantity of services or products needed to support the offerings to the travelers, the identifying the quantity based at least in part on the estimate of the quantity of travelers and the services or products selected to be offered to the travelers;
    forecasting, via the computing device, the quantity of services or products based on extrapolation of historic data including one or more of plane timeliness, plane capacity, and plane usage;
    before providing a second offer to a traveler, presenting, via the computing device, a first offer to the traveler representing an attempt to up-sell, the first offer an upgrade of the second offer;
    providing a notification regarding planned activity of the traveler; and
    offering the traveler a discount coupon based on the planned activity to attract the traveler to at least one of a plurality of business establishments according to a priority based on merchant agreements that determine the priority among the plurality of business establishments.

2. The method of claim 1, wherein the weather data comprises weather data for the destination of where the services or products are to be offered.

3. The method of claim 1, wherein the weather data comprises weather data related to weather experienced or forecasted to be experienced by a set of the travelers during a traveling to the destination of where the services or products are to be offered.

4. The method of claim 1, wherein the generating the estimate of the quantity of travelers further comprises obtaining airline data.

5. The method of claim 4, wherein the airline data comprises one or more of arrival and departure times for airline flights scheduled to arrive at the destination, capacity of the airline flights, and type of airplane to be used in the airline flights scheduled to arrive at the destination.

6. The method of claim 1 further comprising, obtaining a profile of one or more of the travelers to arrive at the destination, individual profiles identifying at least one of preferred services or preferred products of a traveler, or a history of purchased services or products of a traveler.

7. The method of claim 6, wherein the selecting the services or products further comprises selecting services or products to be offered to the travelers based at least in part on the obtained profiles.

8. The method of claim 7, further comprising performing the selecting of services or products, and the identifying the quantity, for multiple separate time periods.

9. The method of claim 8, wherein the identifying a quantity of services or products needed to support the offerings to the travelers comprises inventory of products.

10. The method of claim 9, wherein the identifying a quantity of services or products needed to support the offerings to the travelers, further comprises a quantity of personnel to support offering of the services or products.

11. A non-transitory tangible machine-readable medium having stored thereon a set of instructions, which when executed by a computing device cause the computing device to perform processes comprising:
generating an estimate of a quantity of travelers to arrive at a destination at a designated time periods;
obtaining weather data related to an itinerary of the travelers;
selecting services or products to be offered to the travelers, the services or products to be selected based at least in part on the weather data related to the itinerary of the travelers, wherein the weather data comprises weather data for a point of origin for a set of the travelers;
identifying a quantity of services or products needed to support the offerings to the travelers, the identifying the quantity based at least in part on the estimate of the quantity of travelers and the services or products selected to be offered to the travelers;
forecasting the quantity of services or products based on extrapolation of historic data including one or more of plane timeliness, plane capacity, and plane usage;
before providing a second offer to a traveler, presenting a first offer to the traveler representing an attempt to up-sell, the first offer an upgrade of the second offer;
providing a notification regarding planned activity of the traveler; and
offering the traveler a discount coupon based on the planned activity to attract the traveler to at least one of a plurality of business establishments according to a priority based on merchant agreements that determine the priority among the plurality of business establishments.

12. The machine-readable of claim 11, wherein the weather data comprises weather data for the destination of where the services or products are to be offered.

13. The machine-readable of claim 11, wherein the weather data comprises weather data related to weather experienced or forecasted to be experienced by a set of the travelers during a traveling to the destination of where the services or products are to be offered.

14. The machine-readable of claim 11, wherein the generating the estimate of the quantity of travelers further comprises obtaining airline data.

15. A computer system comprising:
at least one computing device configured to:
generate an estimate of a quantity of travelers to arrive at a destination at a designated time periods;
obtain weather data related to an itinerary of the travelers;
select services or products to be offered to the travelers, the services or products to be selected based at least in part on the weather data related to the itinerary of the travelers, wherein the weather data comprises weather data for a point of origin for a set of the travelers;
identify a quantity of services or products needed to support the offerings to the travelers, the identifying the quantity based at least in part on the estimate of the quantity of travelers and the services or products selected to be offered to the travelers;
forecast the quantity of services or products based on extrapolation of historic data including one or more of plane timeliness, plane capacity, and plane usage;
before providing a second offer to a traveler, present a first offer to the traveler representing an attempt to up-sell, the first offer an upgrade of the second offer;
provide a notification regarding planned activity of the traveler; and
offer the traveler a discount coupon based on the planned activity to attract the traveler to at least one of a plurality of business establishments according to a priority based on merchant agreements that determine the priority among the plurality of business establishments.

16. The computer system of claim 15, wherein the at least one server obtains airline data.

17. The computer system of claim 16 wherein the at least one server obtains a profile of one or more of the travelers to arrive at the destination, individual profiles identifying at least one of preferred services or preferred products of a travel, or a history of purchased services or products of a traveler, wherein the selecting the services or products further comprises selecting services or products to be offered to the travelers based at least in part on the obtained profiles.

* * * * *